(12) United States Patent
Moniz et al.

(10) Patent No.: US 7,269,938 B2
(45) Date of Patent: Sep. 18, 2007

(54) COUNTER-ROTATING GAS TURBINE ENGINE AND METHOD OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 431 days.

(21) Appl. No.: 10/976,494

(22) Filed: Oct. 29, 2004

(65) Prior Publication Data

US 2006/0093464 A1 May 4, 2006

(51) Int. Cl.
F02C 3/067 (2006.01)

(52) U.S. Cl. .................. 60/39.162; 415/68

(58) Field of Classification Search ............. 60/39.162; 415/68
See application file for complete search history.

(56) References Cited

U.S. PATENT DOCUMENTS

| 5,307,622 | A | * | 5/1994 | Ciokajlo et al. ......... 60/39.162 |
| 5,806,303 | A | | 9/1998 | Johnson |
| 5,809,772 | A | | 9/1998 | Giffin, III et al. |
| 5,813,214 | A | * | 9/1998 | Moniz et al. .............. 60/39.08 |
| 5,867,980 | A | | 2/1999 | Bartos |
| 6,071,076 | A | * | 6/2000 | Ansari et al. ........... 416/168 R |
| 6,158,210 | A | * | 12/2000 | Orlando ..................... 60/226.1 |
| 6,619,030 | B1 | | 9/2003 | Seda et al. |
| 6,684,626 | B1 | | 2/2004 | Orlando et al. |
| 6,711,887 | B2 | | 3/2004 | Orlando et al. |
| 6,732,502 | B2 | | 5/2004 | Seda et al. |
| 6,739,120 | B2 | | 5/2004 | Moniz et al. |
| 6,763,652 | B2 | | 7/2004 | Baughman et al. |
| 6,763,653 | B2 | | 7/2004 | Orlando et al. |
| 6,763,654 | B2 | | 7/2004 | Orlando et al. |
| 2006/0090450 | A1 | * | 5/2006 | Moniz et al. .............. 60/226.1 |
| 2006/0093466 | A1 | * | 5/2006 | Seda et al. .................... 415/68 |
| 2006/0093467 | A1 | * | 5/2006 | Orlando et al. ............... 415/68 |
| 2006/0093468 | A1 | * | 5/2006 | Orlando et al. ............... 415/68 |
| 2006/0093469 | A1 | * | 5/2006 | Moniz et al. ................. 415/68 |
| 2007/0006569 | A1 | * | 1/2007 | Brault et al. ............... 60/226.1 |

* cited by examiner

Primary Examiner—William H. Rodriguez
(74) Attorney, Agent, or Firm—William Scott Andes; Armstrong Teasdale LLP

(57) ABSTRACT

A method for assembling a gas turbine engine includes providing a high pressure turbine, providing a low-pressure turbine inner rotor that includes a first plurality of turbine blade rows configured to rotate in a first direction, providing a low-pressure turbine outer rotor that includes a second plurality of turbine blade rows configured to rotate in a second direction that is opposite the first direction, and coupling a plurality of bearings between the outer rotor and a turbine mid-frame between the high pressure turbine and at least one of the inner and outer rotors such that the plurality of bearings support a forward end of the outer rotor.

20 Claims, 6 Drawing Sheets

COUNTER-ROTATING GAS TURBINE ENGINE AND METHOD OF ASSEMBLING SAME

BACKGROUND OF THE INVENTION

This invention relates generally to aircraft gas turbine engines, and more specifically to counter-rotating gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increased inlet radius accommodates additional rotor stages within the low-pressure turbine. Specifically, at least one known counter-rotating low-pressure turbine includes an outer rotor having a first quantity of stages that are rotatably coupled to the forward fan assembly, and an inner rotor having an equal number of stages that is rotatably coupled to the aft fan assembly.

During engine assembly, such known gas turbine engines are assembled such that the outer rotor is cantilevered from the turbine rear-frame. More specifically, the first quantity of rows stages are each coupled together and to the rotating casing to form the outer rotor. The outer rotor is then coupled to the turbine rear-frame using only the last stage of the outer rotor, such that only the last stage of the outer rotor supports the combined weight of the outer rotor rotating casing. Accordingly, to provide the necessary structural strength to such engines, the last stage of the outer rotor is generally much larger and heavier than the other stages of the outer rotor. As such, during operation, the performance penalties associated with the increased weight and size of the last rotor stage may actually negate the benefits of utilizing a counter-rotating low-pressure turbine.

BRIEF DESCRIPTION OF THE INVENTION

In one aspect, a method for assembling a gas turbine engine is provided. The method includes providing a high pressure turbine, providing a low-pressure turbine inner rotor that includes a first plurality of turbine blade rows configured to rotate in a first direction, providing a low-pressure turbine outer rotor that includes a second plurality of turbine blade rows configured to rotate in a second direction that is opposite the first direction, and coupling a plurality of bearings between the outer rotor and a turbine mid-frame between the high pressure turbine and at least one of the inner and outer rotors such that the plurality of bearings support a forward end of the outer rotor.

In another aspect, a counter-rotating low-pressure turbine is provided. The turbine includes an inner rotor including a first plurality of turbine blade rows configured to rotate in a first direction, an outer rotor including a second plurality of turbine blade rows configured to rotate in a second direction that is opposite the first direction, the outer rotor positioned such that at least one of the second plurality of turbine blade rows is coupled axially forward of the first plurality of turbine blade rows, and a plurality of bearings coupled between the outer rotor and the turbine mid-frame such that the plurality of bearings support a forward end of the outer rotor.

In a further aspect, a gas turbine engine is provided. The gas turbine engine includes an inner rotor including a first plurality of turbine blade rows configured to rotate in a first direction, an outer rotor including a second plurality of turbine blade rows configured to rotate in a second direction that is opposite the first direction; the outer rotor coupled to the inner rotor such that at least one of the second plurality of turbine blade rows is coupled axially forward of the first plurality of turbine blade rows, a turbine mid-frame coupled axially forward from the outer rotor, and a plurality of bearings coupled between the outer rotor and the turbine mid-frame such that the plurality of bearings support a forward end of the outer rotor.

DETAILED DESCRIPTION OF THE INVENTION

Figure 1:
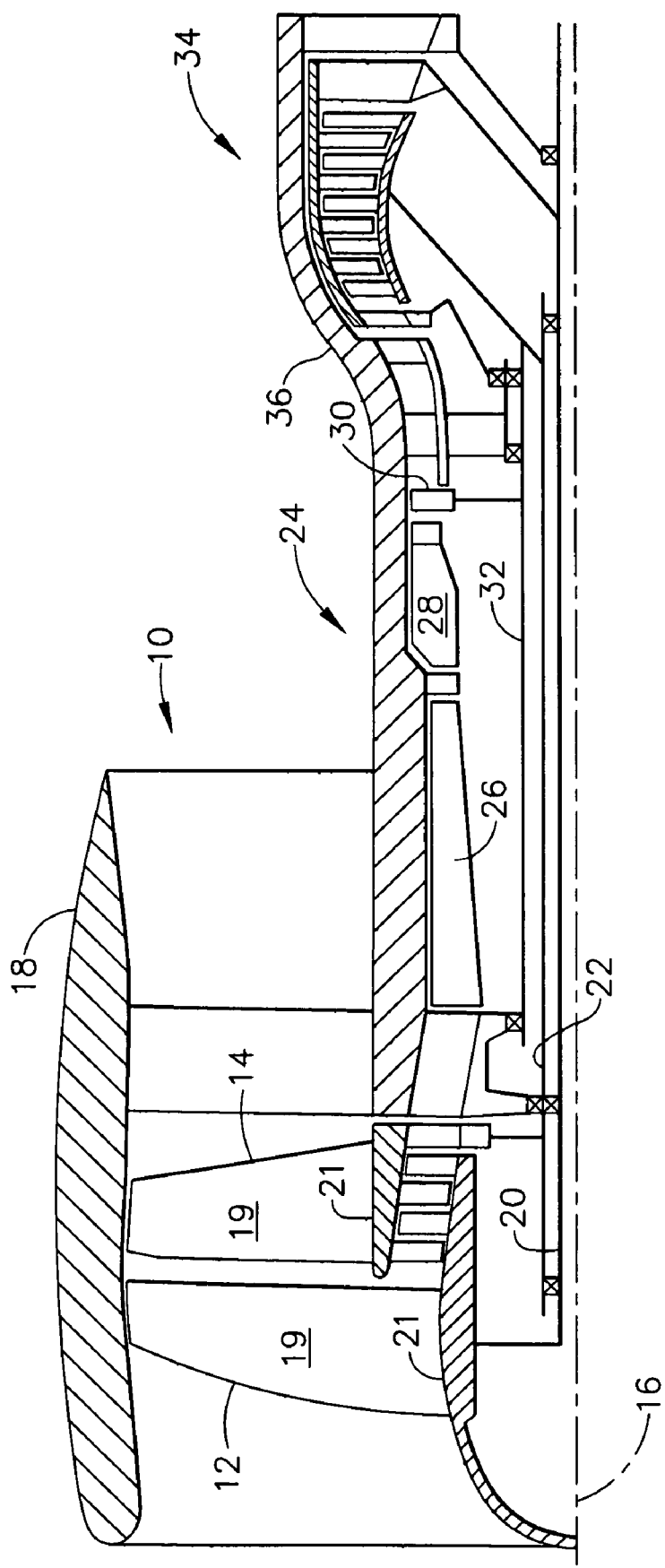
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 16. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Figure 2:
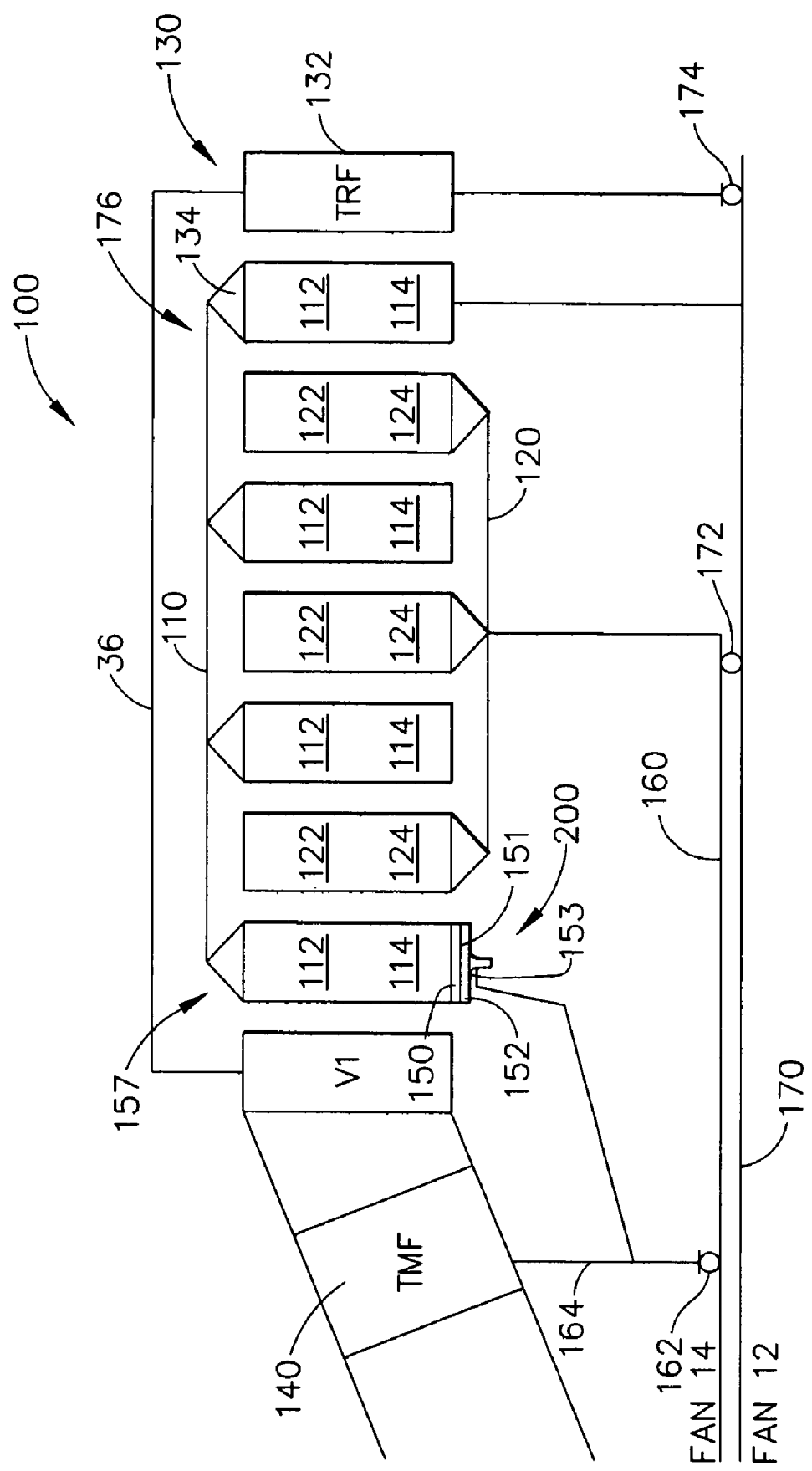
FIG. 2 is a schematic diagram of an exemplary counter-rotating low pressure turbine assembly that can be used with the gas turbine engine shown in FIG. 1.

FIG. 2 is a schematic diagram of a straddle-mounted counter-rotating low-pressure turbine assembly 100 that may be used with a gas turbine engine similar to gas turbine engine 10 (shown in FIG. 1). In the exemplary embodiment, low-pressure turbine 100 includes stationary outer casing 36 (shown in FIG. 1) that is coupled to core engine 24 downstream from high-pressure turbine 30 (shown in FIG. 1). Low-pressure turbine 100 includes a radially outer rotor 110 that is positioned radially inwardly of outer casing 36. Outer rotor 110 has a generally frusto-conical shape and includes a plurality of circumferentially-spaced rotor blades 112 that extend radially inwardly. Blades 112 are arranged in axially-spaced rows 114. Although, the exemplary embodiment illustrates four rows 114 of blades 112, it should be realized that outer rotor 110 may have any quantity of rows 114 of blades 112 without affecting the scope of the method and apparatus described herein. More specifically, outer rotor 110 includes M rows 114 of blades 112.

Low-pressure turbine 100 also includes a radially inner rotor 120 that is aligned substantially coaxially with respect to, and radially inward of, outer rotor 110. Inner rotor 120 includes a plurality of circumferentially-spaced rotor blades 122 that extend radially outwardly and are arranged in axially-spaced rows 124. Although, the exemplary embodiment illustrates three rows 124 of blades 122, it should be realized that inner rotor 120 may have any quantity of rows 124 of blades 122 without affecting the scope of the method and apparatus described herein. More specifically, inner rotor 120 includes N rows 124 of blades 122. In the exemplary embodiment, M=N+1. Accordingly, and in the exemplary embodiment, outer rotor 110 includes an even number of rows 114 and inner rotor 120 includes an odd number of rows 124 such that outer rotor 110 surrounds and/or straddles inner rotor 120.

In the exemplary embodiment, inner rotor blades 122 extending from rows 124 are axially-interdigitated with outer rotor blades 112 extending from rows 114 such that inner rotor rows 124 extend between respective outer rotor rows 114. The blades 112 and 122 are therefore configured for counter-rotation of the rotors 110 and 120.

In the exemplary embodiment, low-pressure turbine 100 also includes a rotor support assembly 130 that includes a stationary annular turbine rear-frame 132 that is aft of low-pressure turbine outer and inner blades 112 and 122. A rotatable aft frame 134 is positioned aft of outer and inner blades 112 and 122 and upstream from turbine rear-frame 132. Frame 134 is coupled to an aft end of outer rotor 110 for rotation therewith and to facilitate providing additional rigidity for supporting blades 112. An annular turbine mid-frame 140 is upstream from outer and inner blades 112 and 122.

Low-pressure turbine 100 also includes a support ring 152 that is coupled to plurality of outer blades 112. More specifically, outer blades 112 each include a platform 150 such that platforms 150 define a platform inner surface 151 that extends radially inward from outer blades 112. A support ring 152 is coupled to plurality of platforms 150 to facilitate forming a relatively smooth support ring inner surface 153 that is radially inward from platforms 150. In the exemplary embodiment, support ring 152 has an outer circumference 154 (shown in FIG. 3) that is selectively sized such that support ring 152 is positioned radially inward from platforms 150 and extends 360 degrees around an inner periphery of low-pressure turbine 100.

A first shaft 160 extends between inner rotor 120 and fan 14 such that inner rotor 120 is rotatably coupled to fan 14. In the exemplary embodiment, first shaft 160 is positioned radially inward of platforms 150. A first shaft bearing 162 is coupled to first shaft 160 such that the weight of inner rotor 120 is distributed approximately equally about the circumference of gas turbine engine 10 at forward end 157, via a structural member 164.

Low-pressure turbine 100 also includes a second shaft 170 that rotatably couples fan 12, outer rotor 110, and turbine rear-frame 132 together. More specifically, low-pressure turbine 100 includes a second shaft differential bearing 172 coupled between first shaft 160 and second shaft 170, and a second bearing 174 coupled between second shaft 170 and turbine rear-frame 132. Specifically, second shaft 170 extends between fan 12 and turbine rear-frame 132 such that the weight of outer rotor 110 at an aft end 176 is distributed approximately equally about the circumference of gas turbine engine 10 at aft end 176, via bearing 174 and turbine rear-frame 132. Low-pressure turbine 100 also includes a plurality of bearing assemblies 200 that are rotatably coupled to support ring 152 and fixedly coupled to turbine mid-frame 140.

Figure 3:
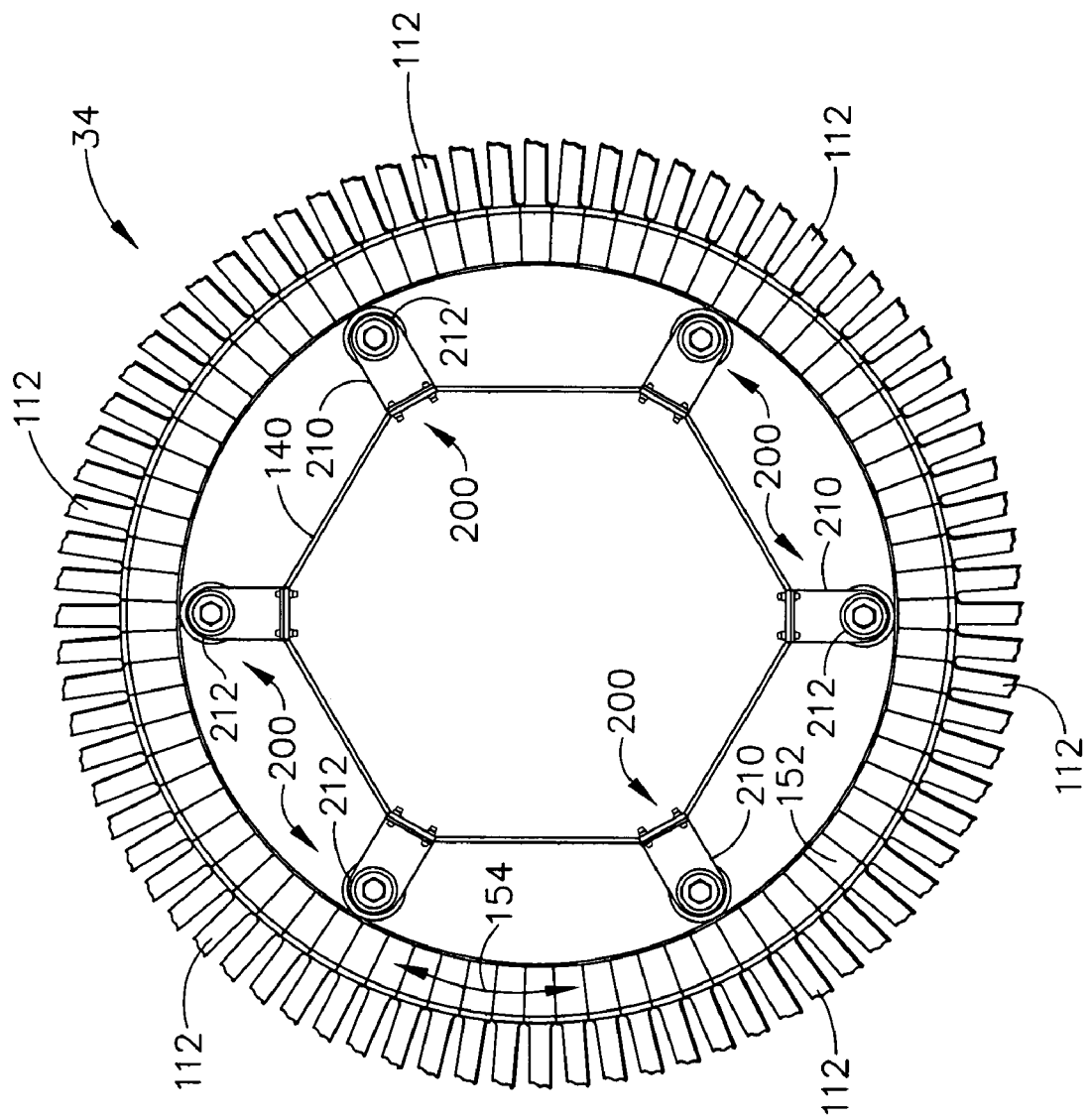
FIG. 3 is an end view of an exemplary bearing assembly that can be used with the counter-rotating low-pressure turbine shown in FIG. 2.
Figure 4:
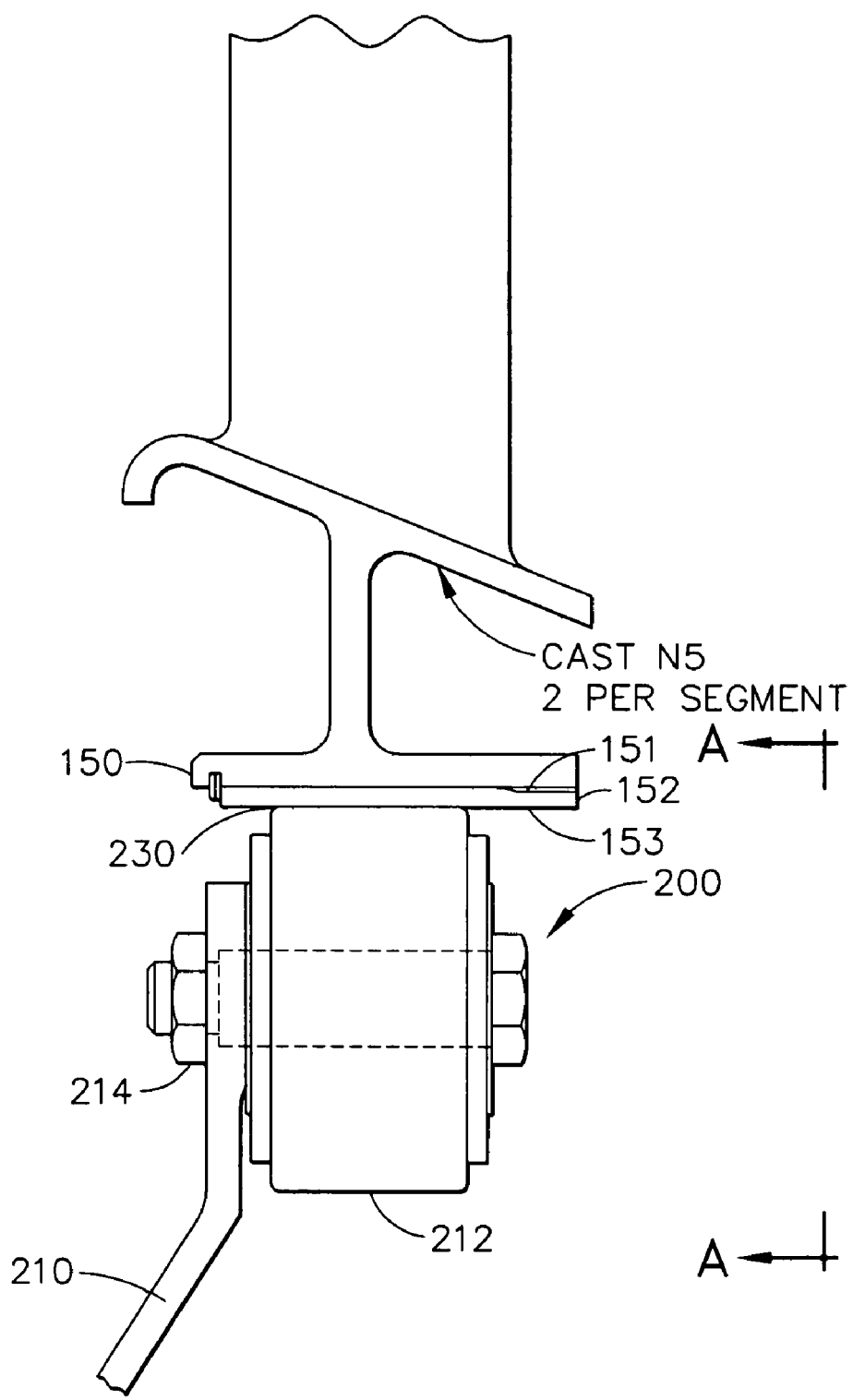
FIG. 4 is an expanded view of a portion of counter-rotating low-pressure turbine shown in FIG. 3 taken along view A-A.
Figure 5:
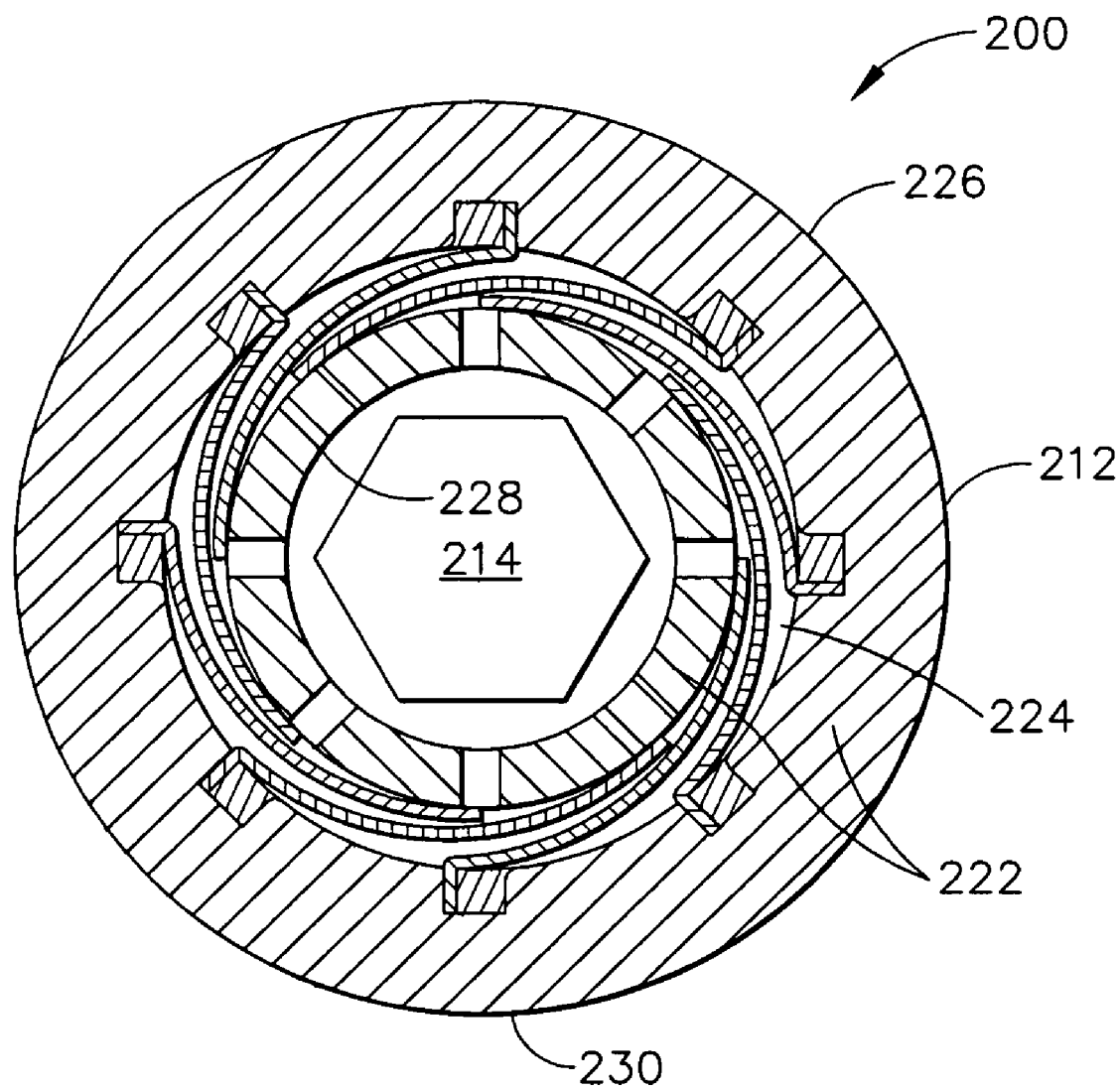
FIG. 5 is a side view of an exemplary foil bearing.

FIG. 3 is an end view of a portion of counter-rotating low-pressure turbine 100 shown in FIG. 2. FIG. 4 is an expanded view of a portion of counter-rotating low-pressure turbine 100 shown in FIG. 2 taken along view A-A. FIG. 5 is a side view of an exemplary foil bearing.

In the exemplary embodiment, gas turbine engine 10 includes a plurality of bearing assemblies 200 to facilitate providing structural support to low-pressure turbine 34 during maneuver loading. Bearing assemblies 200 are circumferentially spaced about support ring interior surface 153 (shown in FIG. 3) to facilitate providing rotational support to low-pressure turbine 34. More specifically, and in the exemplary embodiment, six bearing assemblies 200 are circumferentially spaced approximately equidistantly about support ring interior surface 153. Although the exemplary embodiment describes six support bearing assemblies 200, it should be realized that gas turbine engine 10 can include any quantity of bearing assemblies 200 to facilitate supporting low-pressure turbine 34.

Each bearing assembly 200 includes a support member 210 that is fixedly secured to turbine mid-frame 140 and is rotatably coupled to bearing assembly 200 using at least one fastener 214. In one embodiment, each bearing assembly 200 includes a foil bearing 212 that includes a paired race 222, and at least one foil element 224. Paired race 222 includes an outer race 226 and an inner race 228 that is radially inward from outer race 226. Foil elements 224 extend between inner race 228 and outer race 226 and each include a plurality of compliant metal foils 224 that are each secured to outer race 226 to facilitate inner race 228 rotating relative to outer race 226. In the exemplary embodiment, foil bearings 212 facilitate reducing the affects of maneuver loads on counter-rotating low-pressure turbine 34 while also increasing clearance control and sealing between rotors 110 and 120. Further, using bearing assemblies 200 within gas turbine engine 10 facilitates reducing a fabrication cost of the gas turbine engine since the foil bearings do not require lubrication, have no DN speed limit, wherein D is defined as a diameter of the bearing bore in millimeters, and N is defined as the top speed of the bearing in revolutions per minute, require no maintenance, and are self-acting hydrodynamic "float on air" devices. In another embodiment, bearing assemblies 200 include at least one of a roller bearing, a ball bearing, and/or a needle bearing.

In the exemplary embodiment, during engine operation, a radial force generated during rotation of low-pressure turbine 34 is transmitted to bearing assemblies 200 via support ring 152. More, specifically, as low-pressure turbine 34 rotates, an exterior surface 230 of each bearing 212 contacts inner surface 153 of support ring 152 to facilitate reducing radial movement of low-pressure turbine 34. Since each respective bearing 212 is coupled to outer casing 36 through support member 210 and turbine mid-frame 140, low-pressure turbine 34 maintains a relatively constant radial position with respect to outer casing 36. More specifically, as low-pressure turbine 34 is forced radially outward during operation, because each bearing 212 is attached to outer casing 36, any radial movement of low-pressure turbine 34 is transmitted to casing 36 such that low-pressure turbine 34 is maintained in a relatively constant radial position with respect to outer casing 36.

Figure 6:
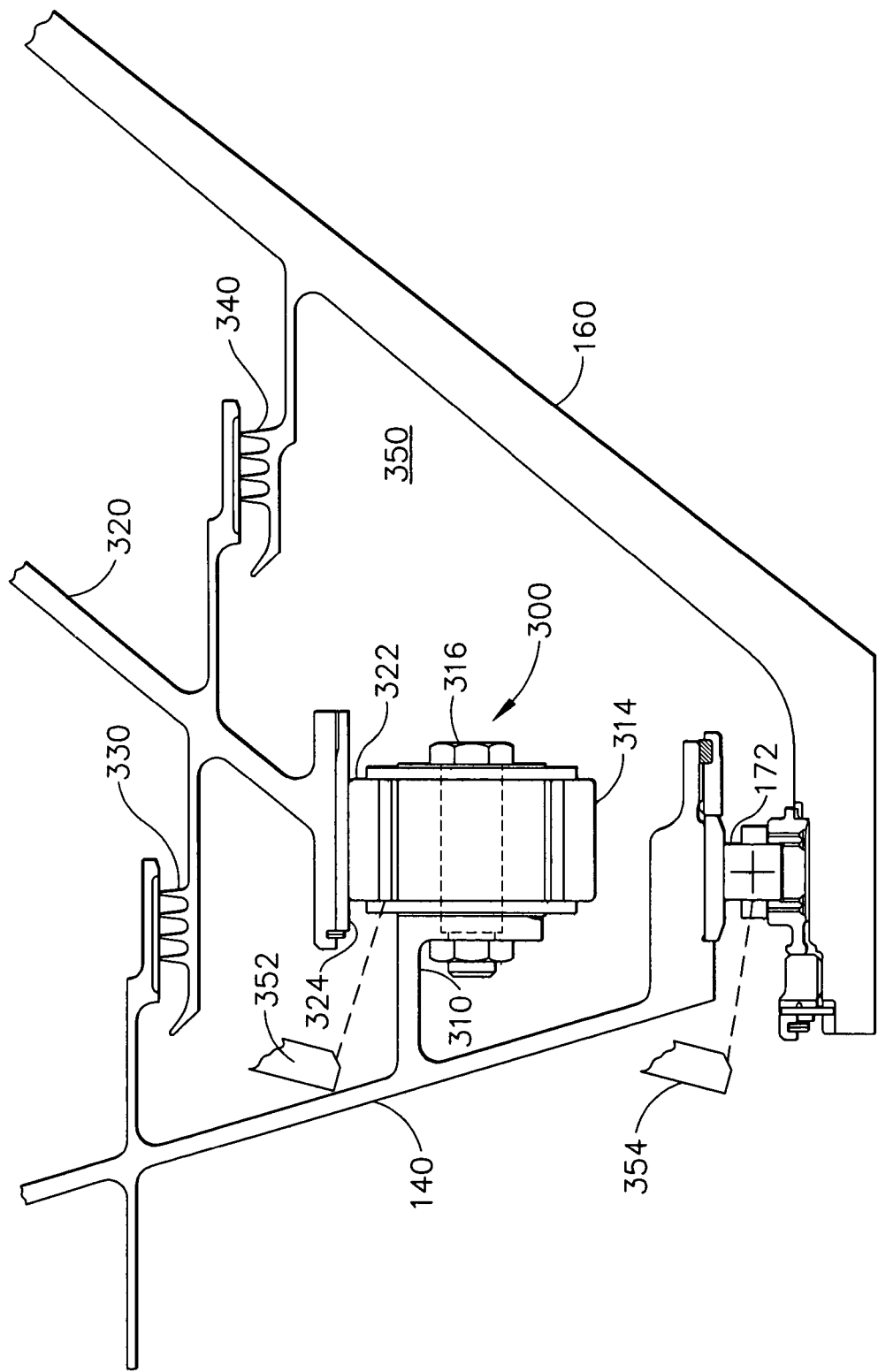
FIG. 6 is an expanded view of an exemplary bearing assembly that can be used with the low-pressure turbine shown in FIG. 2.

FIG. 6 is an expanded view of an exemplary bearing assembly 300 that can be used with low-pressure turbine 34 shown in FIG. 2. In the exemplary embodiment, gas turbine engine 10 includes a plurality of bearing assemblies 300 to facilitate providing structural support to low-pressure turbine 34 during maneuver loading. Each bearing assembly 300 includes a support member 310 that is fixedly secured to turbine mid-frame 140 and is rotatably coupled to a bearing 314 using at least one fastener 316. In one embodiment, at least one of bearings 314 is a foil bearing. In another embodiment, bearing assemblies 300 include at least one of a roller bearing, a ball bearing, and/or a needle bearing.

In the exemplary embodiment, bearings 314 facilitate reducing the affects of maneuver loads on counter-rotating low-pressure turbine 34 while also increasing clearance control and sealing between the rotors.

In the exemplary embodiment, during engine operation, a radial force generated during rotation of low-pressure turbine 34 is transmitted from low-pressure turbine 34 to bearing assemblies 300 via a support structure 320 that is coupled to outer rotor 110. More specifically, as low-pressure turbine 34 rotates, an exterior surface 322 of each bearing 314 contacts an exterior surface 324 of support structure 320 to facilitate reducing radial movement of low-pressure turbine 34. Since each respective bearing 314 is coupled to outer casing 36 (shown in FIG. 2) through support member 310 and turbine mid-frame 140, low-pressure turbine 34 maintains a relatively constant radial position with respect to outer casing 36. More specifically, as low-pressure turbine 34 is forced radially outward during operation, because each bearing 314 is attached to outer casing 36, any radial movement of low-pressure turbine 34 is transmitted to outer casing 36 such that low-pressure turbine 34 is maintained in a relatively constant radial position with respect to outer casing 36. Gas turbine engine 10 also includes a first seal 330 that is coupled to support structure 320 to facilitate creating a sealed cavity between rotating support structure 320 and turbine mid-frame 140. A second seal 340 is coupled between support structure 320 and shaft 160. Accordingly, and in the exemplary embodiment, seals 330 and 340 facilitate forming a sump 350. During operation, a lubricant, such as oil, is channeled through a respective opening 352 to facilitate lubricating bearing assembly 300, and through a respective opening 354 to facilitate lubricating bearing 172.

In the exemplary embodiment, during engine operation, a radial force generated during rotation of outer rotor 110 is transmitted to bearing assemblies 300. Specifically, as outer rotor 110 rotates, bearing 314 contacts support outer rotor 110 via support structure 320, and turbine mid-frame 140 to facilitate reducing radial movement of outer rotor 110. Since each respective bearing 314 is coupled to outer casing 36 through turbine mid-frame 140 and support structure 320, outer rotor 110 is maintained in a relatively constant radial position with respect to outer casing 36.

The exemplary embodiments described above illustrate a counter-rotating low-pressure turbine having an outer rotor that includes an even number of rows of blades and an inner rotor that includes an odd number of rows of blades such that the outer rotor straddles the inner rotor. Since, the outer rotor straddles the inner rotor, the outer rotor is configurable to couple to either the forward or aft fan assembly 12 and 14. Moreover, the bearing assemblies described herein facilitate distributing the weight of outer rotor approximately equally between turbine mid-frame and turbine rear-frame. Accordingly, the size of the turbine rear-frame can be reduced resulting in reduced production and assembly costs.

Exemplary embodiments of straddle-mounted counter-rotating low-pressure turbines including outer rotor support bearing assemblies are described above in detail. The components are not limited to the specific embodiments described herein, but rather, components of each system may be utilized independently and separately from other components described herein. The bearing assemblies described herein can also be used in combination with other known gas turbine engines.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a high pressure turbine;
   providing a low-pressure turbine inner rotor that includes a first plurality of turbine blade rows configured to rotate in a first direction;
   providing a low-pressure turbine outer rotor that includes a second plurality of turbine blade rows configured to rotate in a second direction that is opposite the first direction; and
   coupling a plurality of bearings between the outer rotor and a turbine mid-frame between the high pressure turbine and at least one of the inner and outer rotors such that the plurality of bearings support a forward end of the outer rotor.

2. A method in accordance with claim 1 further comprising coupling a support ring to the second plurality of turbine blades such that the plurality of bearings rotatably support the support ring.

3. A method in accordance with claim 1 wherein coupling a plurality of bearings between the outer rotor and a turbine mid-frame further comprises coupling at least four bearings between the outer rotor and a turbine mid-frame.

4. A method in accordance with claim 1 further comprising:
   coupling at least one support member to the turbine mid-frame; and
   coupling a bearing to the support member such that the bearing supports a forward end of the outer rotor.

5. A method in accordance with claim 1 wherein coupling a plurality of bearings between the outer rotor and a turbine mid-frame further comprises coupling a plurality of bearings between the outer rotor and the turbine mid-frame such that the plurality of bearings are space approximately equidistantly about an inner periphery of the outer rotor.

6. A method in accordance with claim 1 further comprising:
coupling a support member to the outer rotor;
coupling a first seal member to the support member in sealing contact between the support assembly and the turbine mid-frame; and
coupling a second seal member to the support member in sealing contact between the support member and an inner rotor shaft.

7. A counter-rotating low-pressure turbine comprising:
an inner rotor comprising a first plurality of turbine blade rows configured to rotate in a first direction;
an outer rotor comprising a second plurality of turbine blade rows configured to rotate in a second direction that is opposite said first direction, said outer rotor positioned such that at least one of the second plurality of turbine blade rows is coupled axially forward of the first plurality of turbine blade rows;
a turbine mid-frame coupled axially forward from said outer rotor; and
a plurality of bearings coupled between said outer rotor and said turbine mid-frame such that said plurality of bearings support a forward end of said outer rotor.

8. A counter-rotating low-pressure turbine in accordance with claim 7 further comprising a support ring coupled to said second plurality of turbine blades such that said bearings rotatably support said support ring.

9. A counter-rotating low-pressure turbine in accordance with claim 7 further comprising a support member rotatably coupled to at least one of said plurality of bearings to said turbine mid-frame.

10. A counter-rotating low-pressure turbine in accordance with claim 7 wherein said plurality of bearings are spaced approximately equidistantly about an inner periphery of said outer rotor.

11. A counter-rotating low-pressure turbine in accordance with claim 10 wherein said each of said plurality of bearings is a foil bearing.

12. A counter-rotating low-pressure turbine in accordance with claim 7 further comprising:
at least one support member securedly coupled to said turbine mid-frame, said plurality of bearings rotatably coupled to said support member such that said plurality of bearings support a forward end of said outer rotor.

13. A counter-rotating low-pressure turbine in accordance with claim 12 further comprising:
a first seal member coupled to said at least one support member in sealing contact between said support member and said turbine mid-frame; and
a second seal member coupled to said support member in sealing contact between said support member and an inner rotor shaft.

14. A counter-rotating low-pressure turbine in accordance with claim 13 wherein said first and second seal members define a cavity between said turbine mid-frame, said outer rotor, and said inner rotor shaft, said low-pressure turbine further comprises a bearing rotatably coupled between said support member and said first shaft within said cavity.

15. A gas turbine engine comprising:
an inner rotor comprising a first plurality of turbine blade rows configured to rotate in a first direction;
an outer rotor comprising a second plurality of turbine blade rows configured to rotate in a second direction that is opposite said first direction, said outer rotor coupled to said inner rotor such that at least one of said second plurality of turbine blade rows is coupled axially forward of said first plurality of turbine blade rows;
a turbine mid-frame coupled axially forward from said outer rotor; and
a plurality of bearings coupled between said outer rotor and said turbine mid-frame such that said plurality of bearings support a forward end of said outer rotor.

16. A gas turbine engine in accordance with claim 15 further comprising:
a support ring coupled to said second plurality of turbine blades such that said plurality of bearings rotatably support said support ring; and
a support member rotatably coupled to at least one of said plurality of bearings and to said turbine mid-frame.

17. A gas turbine engine in accordance with claim 15 wherein said plurality of bearings are spaced approximately equidistantly about an inner periphery of said outer rotor.

18. A gas turbine engine in accordance with claim 15 wherein at least one of said plurality of bearings comprises at least one of a foil bearing, a needle bearing, and a ball bearing.

19. A gas turbine engine in accordance with claim 15 further comprising:
at least one support member securedly coupled to said turbine mid-frame; and
at least one bearing rotatably coupled to said support member such that said bearing supports a forward end of said outer rotor.

20. A gas turbine engine in accordance with claim 15 further comprising:
a first seal member coupled to said at least one support member in sealing contact between said support assembly and said turbine mid-frame;
a second seal member coupled to said support member in sealing contact between said support member and an inner rotor shaft, wherein said first and second seal members define a cavity between said turbine mid-frame, said outer rotor, and said inner rotor shaft; and
at least one bearing rotatably coupled between said support member and said first shaft within said cavity.

* * * * *